July 24, 1923.
F. C. STEVENS
SHEET GRIPPER
Filed July 2, 1921
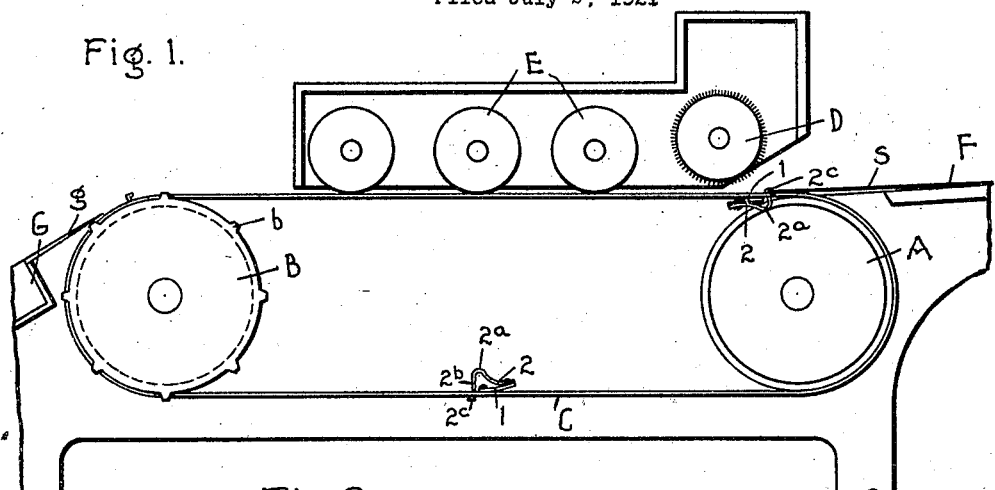
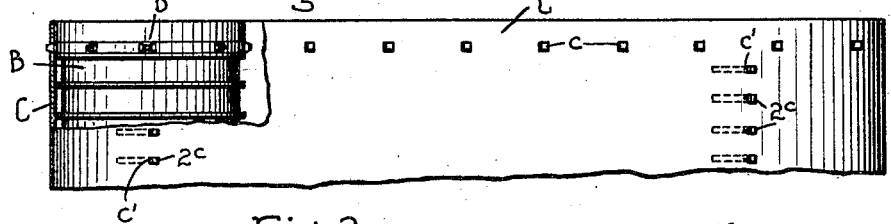
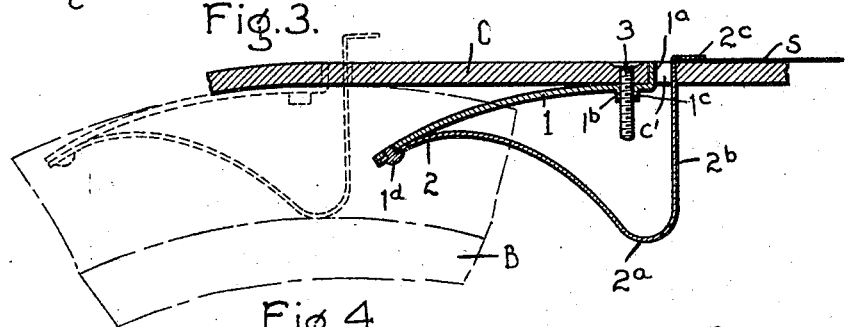
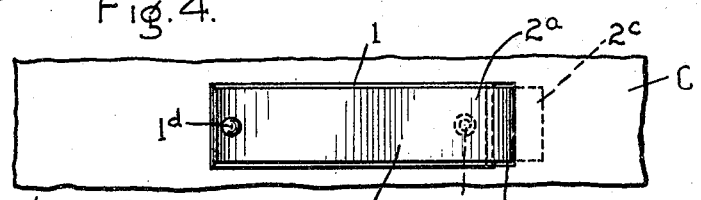
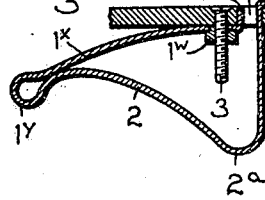
Inventor:
Frank C. Stevens
By Alexander Powell
His Attorneys Patented July 24, 1923.

1,462,923

UNITED STATES PATENT OFFICE.

FRANK C. STEVENS, OF COHASSET, MASSACHUSETTS, ASSIGNOR TO UNITED PRINTING MACHINERY COMPANY, OF BOSTON, MASSACHUSETTS, A CORPORATION OF MASSACHUSETTS.

SHEET GRIPPER.

Application filed July 2, 1921. Serial No. 482,166.

*To all whom it may concern:*

Be it known that I, FRANK C. STEVENS, citizen of the United States, residing at Cohasset, in the county of Plymouth and State of Massachusetts, have invented certain new and useful Improvements in Sheet Grippers; and I hereby declare that the following is a full, clear, and exact description thereof, reference being had to the accompanying drawings, which form part of this specification.

This invention is a novel improvement in sheet grippers, and is especially designed for use in connection with endless belts to enable sheets to be moved by said belts from one position to another. The invention is particularly adapted for use in bronzing machines in which an endless belt is employed to transfer sheets of paper from the feed through the bronzing mechanism to the delivery table. The principal objects of the invention are to provide a spring gripper which will be efficient in operation, and which can be readily applied to the belt by inserting it through an opening in the belt, or detached from the belt, without having to dismount the belt; also to provide a very simple and efficient gripper, efficient and reliable in operation and economical in construction.

I will explain the invention with reference to the accompanying drawings which illustrate one practical embodiment thereof, and diagrammatically illustrate the application of this gripper to the platen belt of a bronzing machine.

In said drawings:

Figure 1 is a diagrammatical side elevation of part of a bronzing machine having an endless platen belt equipped with my novel grippers.

Fig. 2 is a diagrammatical plan view of part of such machine.

Fig. 3 is a side view of the gripper applied to such a belt and indicated in opened position in dotted lines.

Fig. 4 is a bottom plan view of such gripper as shown in Fig. 3.

Fig. 5 illustrates a slight modification.

The bronzing machine indicated in the drawing has an endless platen belt C, running over cylinders A and B at the feed and delivery ends of the machine.

Preferably the belt C is provided with openings $c$ adjacent its edges adapted to engage a sprocket $b$ on the drum B to insure that the belt will travel uniformly and regularly when the cylinder is in operation.

Above the belt C are arranged the bronzing devices, which are illustrated as comprising a bronze feed roller D and a series of brushing rollers E.

The feed board F is adjacent the cylinder A, and the receiving table G is adjacent the roll B, the sheets being taken by grippers on the belt C from the feed board F and conveyed beneath the bronzing mechanism and discharged as they pass the roll B onto the delivery table G. The particular construction and operation of the bronzing machine forms no part of the present invention and is not claimed herein and further description thereof is unnecessary, as the invention is adapted for use with various types and kinds of machines using endless belts to carry the grippers. The belt C may be of any suitable material; being preferably made of canvas and rubber; this belt is provided with series of transverse perforations $c'$ at the points where the grippers are to be arranged. Heretofore such belts have been provided with spring grippers which project through these openings and are adapted to engage a sheet on the upper side of the belt while the body of the grippers depend below the belt; and such grippers have been adapted to be automatically opened by contact with the periphery of the cylinder A as the grippers pass around it and to automatically close upon the edge of a sheet supplied from the board F as they leave the periphery of the cylinder A, and to hold the sheet and cause it to travel with the belt until it has passed the bronzing devices and reaches the cylinder B where the grippers are again automatically opened by contact with the periphery of cylinder B and the sheet is thus released and discharged over the cylinder B onto the delivery table G in the usual manner.

In the present invention the gripper comprises supporting member 1 and a spring member 2. The member 1 may be formed of a piece of strap metal, one end of which is preferably upturned at approximately right angles as at $1^a$, and is inserted in one of the slots $c'$ in the belt C so as to closely contact the leading edge of the slot (see Fig. 3). Adjacent end $1^a$ of the slot the strap has a threaded opening 13 preferably surrounded by a boss 1c to give increased length to the threads which are engaged by a screw 3 passed through a perforation in the belt C in advance of and adjacent the related slot c' (see Fig. 3), the head of this screw being preferably flush with the outer surface of the belt C as shown. Beyond the screw 3 the plate 1 curves downwardly or away from the belt as shown and to the rear edge of this plate 1 is secured (preferably by a rivet 1d), one end of the gripper spring 2. This spring is formed of a strip of steel and it is curved preferably forwardly and downwardly and then bent to form a large depending bend 2a and from which it extends directly up to and through the related slot c', the portion 2b of the spring directly below the slot being preferably straight. The end of the spring projecting above the belt C is bent at right angles to the part 2b forming a gripping lip 2c which lies flat upon the surface of the belt C and is normally held in close contact therewith by the resilient action of the spring itself, and will remain in contact therewith unless it is forcibly raised. These spring members have sufficient power to hold a sheet of paper S firmly when engaged therewith, and to draw the same along with the belt.

The cylinders B and A are annularly ribbed or grooved at the points where they would be contacted by the grippers 2, these ribs or grooves being sufficiently deep to permit the ends of the holders 1 to pass around the cylinders without engaging therewith but the bends 2a of the springs will engage the peripheries of the cylinders, (or bottoms of the grooves in the cylinders) as the grippers pass around the cylinders, sufficiently to cause the grippers to open as indicated in dotted lines in Fig. 3; so that when the grippers reach the top of cylinder A they are open and the edge of a sheet S can be inserted thereunder. The grippers close automatically upon the sheet S as they pass over the top of cylinder A and clamp the edge of the sheet against the surface of the belt and draw the sheet forward with the belt under the bronzing devices; until the grippers reach the cylinder B, where they are again opened by the bends 2a of the grippers contacting with the periphery of cylinder B or bottom of the grooves in the cylinder B; the sheet being then released passes on and over the cylinder B to the delivery table G; the sheets being directed onto the table G by stripper fingers g in the usual manner.

In my grippers the spring members have no sharp return bends and therefore their durability is greatly enhanced. The bite of the gripper can be varied by varying the curvature of the supporting member 1.

The supporting member provides a substantial and firm connection between the gripper spring and the belt, and enables the gripper to be securely fastened in place by a single screw. The plate 1 may be made of substantial thickness so as to afford a sufficient hold for the screw 3.

While I prefer to make the spring member and supporting member separately, as that enables me to use a stiffer supporting member, lessens the danger of breakage, and cost of repairs; it is obvious that the members 1 and 2 might be made integral. As indicated in Fig. 5 the supporting member 1x is formed integral with the member 2 and connected therewith by a bend 1y. The member 1x may be provided with a collar 1w riveted to its end adjacent the bend 1a, said collar being internally threaded to engage the screw 3. The construction and functions of the parts shown in Fig. 5 are the same as above described.

The entire gripper can be readily attached to the belt by forcibly pressing the spring member 2 against the supporting member 1 and inserting the same through the small opening c' in the belt until the lip 1a of the supporting member rests on the belt C, then the gripper can be turned under the belt to the position indicated in Fig. 3; and the screw 3 engaged with the holding member securely binding the same in place. This attachment can be made without removing the belt, and it is a very great advantage in the practical use of the machine, as the belts C are wide, sometimes being as much as five feet wide, and usually run on cylinders not larger than 8 inches in diameter, and heretofore in event of breaking a gripper a great deal of trouble was experienced in removing it and applying a new one to the belt, unless the belt was removed. My grippers are less liable to break and if broken can be readily renewed and a new one inserted through the apertures in the belt, as described.

It will be seen that although the novel gripper can be inserted through the perforation through which it operates, the gripper when inserted through the belt and secured in operative position is very much larger than the perforation through which it was inserted. The perforations for the grippers must be small, so that little, if any, bronze powder can pass through them when the grippers are in place.

I claim:

1. A gripper for the purpose specified comprising a supporting member adapted to be detachably attached to the belt, and a spring member extending from the free end of the supporting member and having a bend and a portion extending from the bend through an opening in the belt provided with a sheet engaging part, substantially as described.

2. A gripper comprising a supporting member having one end adapted to be engaged with an opening in a supporting belt, and a spring member extending from the free end of the said supporting member and having its free end adapted to extend through an opening in the belt and provided with a sheet engaging part on its upper end to hold the sheet against the belt.

3. A gripper for the purpose specified comprising a supporting member adapted to be attached to a belt, and a curved spring member attached at one end to the supporting member and having its free end adapted to project through an opening in the belt and provided with a part adapted to hold a sheet against the belt, substantially as described.

4. A gripper comprising a supporting member having one end adapted to be engaged with an opening in a belt, and a spring member having one end attached to the free end of the said supporting member and its free end extended through an opening in the belt, and provided with a sheet engaging lip on its extremity to hold the sheet against the belt.

5. A gripper for the purpose specified comprising a supporting member detachably attached to a belt, and a spring member attached to one end of the supporting member and having an intermediate bend and a portion projecting from the bend adapted to pass through an opening in the belt and provided with a sheet engaging part on its extremity, substantially as described.

6. A gripper comprising a curved supporting plate having one end adapted to be engaged with an opening in a supporting belt; and a spring member having one end attached to the free end of the said plate and having an intermediate bend and its free end extended through the opening in the belt and provided with a sheet engaging part on its extremity to hold the sheet against the belt.

7. In a device of the character specified the combination of a belt provided with a perforation, a plate attached to the inner side of the belt adjacent the opening, and a gripper spring having one end attached to the free end of the plate and having a bend and a portion extending from the bend through the perforation in the belt and having a part on its upper end normally pressed upon the outer side of the belt and adapted to hold a sheet of paper thereagainst.

8. In a device of the character specified the combination of a belt provided with a perforation, a plate attached to the inner side of the belt adjacent the perforation, means fastening the plate to the belt, and a gripper spring having one end attached to the free end of the plate and bent forwardly and having a depending curve and a portion extending through the perforation in the belt and having a part on its outer end adapted to hold a sheet of paper against the outer side of the belt.

9. In a device of the character specified, the combination of a belt provided with a perforation, a plate attached to the inner side of the belt and having a lip on one end entering one side of the said perforation; a screw passed through the belt and engaging said plate, and a gripper spring having one end attached to the free end of the plate and having a depending curve and a part extending through the perforation in the belt and having a lip on its outer end resting upon the outer side of the belt and adapted to hold a sheet of paper thereagainst.

10. In combination with a belt provided with a small perforation through which the gripper operates; of a gripper adapted to be bodily inserted through such perforation in the belt from one side thereof into operative position, the main body of the gripper being disposed at the side of the belt opposite the side from which it was inserted through the perforation, and means for fastening the gripper when so positioned to the belt.

11. In combination with a belt provided with a transverse series of perforations through each of which a gripper operates; of a series of grippers each adapted to be inserted through a related perforation in the belt into operative position, the main body of the gripper being disposed at the side of the belt opposite the side from which it was inserted through the perforation, and means for fastening each gripper when so positioned to the belt.

12. In combination with a belt having a perforation through which a gripper operates, a gripper adapted to be inserted into operative position through the perforation in the belt from the outside of the belt to the inside thereof, the main body of the gripper being disposed at the side of the belt opposite the side from which it was inserted through the perforation, one end of the gripper having a sheet engaging part projecting through the opening and a fastener engaging the gripper to secure the same in place; the gripper being insertable and removable through the perforation in the belt.

13. In combination with a belt having a perforation through which a gripper operates, a gripper adapted to be inserted into operative position through the perforation in the belt from the outside of the belt to the inside thereof, the body of the gripper inserted through the perforation being much larger than the perforation when the gripper is in operative position, one end of the gripper having a sheet engaging part projecting through the opening and the other end of the gripper having means for engaging a fastening device; and a fastener extending through the belt and engaging the gripper means to secure the gripper to the belt.

14. In combination with a belt having a series of transverse perforations through each of which a gripper operates; a series of grippers each adapted to be inserted through a related perforation in the belt from the outside of the belt to the inside thereof the body of each gripper lying to the inside of the belt, the body of the gripper inserted through the perforation being much larger than the perforation when the gripper is in operative position, one end of the gripper having a sheet engaging part projecting through the opening and the other end of the gripper formed to engage a fastening device; and a fastener engaging the said device to secure the gripper in place; each gripper being insertable and removable through a perforation in the belt at any portion of the width thereof.

15. In combination with a belt having a series of transverse perforations, grippers each adapted to be inserted through a perforation in the belt from the outside of the belt to the inside thereof, the body of the gripper lying to the inside of the belt, one end of the gripper having a sheet engaging part projecting through the opening and the other end of the gripper engaging the edge of the opening and formed to engage a fastening device; and a fastener extending through the belt and engaging the said device of the related gripper to secure the same in place, each gripper being insertable and removable through a perforation in the belt at any portion of the width thereof.

In testimony that I claim the foregoing as my own, I affix my signature.

FRANK C. STEVENS.